(12) United States Patent
Shmouely et al.

(10) Patent No.: US 11,385,886 B2
(45) Date of Patent: Jul. 12, 2022

(54) VALIDATION AND PREDICTION OF CLOUD READINESS

(71) Applicant: Microsoft Technology Licensing, LLC, Redmond, WA (US)

(72) Inventors: Meir Shmouely, Sammamish, WA (US); Rahul Shah, Redmond, WA (US); Alexander Frank, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 16/729,194

(22) Filed: Dec. 27, 2019

(65) Prior Publication Data

US 2021/0200525 A1 Jul. 1, 2021

(51) Int. Cl.
| | |
|---|---|
| G06F 9/44 | (2018.01) |
| G06F 8/65 | (2018.01) |
| G06F 11/36 | (2006.01) |
| G06N 7/00 | (2006.01) |
| H04L 41/082 | (2022.01) |
| H04L 41/147 | (2022.01) |
| H04L 43/16 | (2022.01) |
| H04L 43/50 | (2022.01) |
| H04L 67/10 | (2022.01) |
| H04L 67/00 | (2022.01) |

(52) U.S. Cl.
CPC ............ G06F 8/65 (2013.01); G06F 11/3664 (2013.01); G06F 11/3688 (2013.01); G06F 11/3692 (2013.01); G06N 7/005 (2013.01); H04L 41/082 (2013.01); H04L 41/147 (2013.01); H04L 43/16 (2013.01); H04L 43/50 (2013.01); H04L 67/10 (2013.01); H04L 67/34 (2013.01)

(58) Field of Classification Search
None
See application file for complete search history.

(56) References Cited

U.S. PATENT DOCUMENTS

| | | | |
|---|---|---|---|
| 2015/0271026 A1* | 9/2015 | Meduri | H04L 67/18 709/224 |
| 2016/0094401 A1* | 3/2016 | Anwar | G06F 11/3006 709/223 |
| 2019/0179944 A1* | 6/2019 | Ungar | H04L 41/142 |
| 2019/0334786 A1* | 10/2019 | Dutta | G06F 11/3006 |

OTHER PUBLICATIONS

"International Search Report and Written Opinion Issued in PCT Application No. PCT/US20/060816", dated Apr. 29, 2021, 18 Pages.

* cited by examiner

*Primary Examiner* — Anna C Deng
(74) *Attorney, Agent, or Firm* — International IP Law Group, PLLC

(57) ABSTRACT

A method for validation and prediction of cloud readiness is described. Method includes identifying a sample of components from a cloud infrastructure, wherein an update is applied to the sample to generate a treated sample and the treated sample is of a statistically sufficient scale and a relevant cloud-level diversity and identifying a control sample of components from the cloud infrastructure, wherein the control sample is statistically comparable to the treated sample. The method also includes executing a set of workloads on the treated sample and the control sample. Further, the method includes predicting an impact of the update on a user experience based on a comparison of telemetry captured during execution of the set of workloads on the treated sample and the control sample.

16 Claims, 5 Drawing Sheets

VALIDATION AND PREDICTION OF CLOUD READINESS

BACKGROUND

Computer hardware, such as a processing unit, is fabricated on silicon chips. In particular, a number of transistors may be etched onto a silicon wafer to realize a particular set of elements. These elements include logic gates, registers, arithmetic logic units, and the like. The particular configuration and interconnection of these elements may be according to an instruction set architecture. Errors such as flaws, defects, or bugs may be discovered in the hardware. Some of these errors may be hardware errors that are irreversibly etched onto the silicon of the hardware. Other errors may be rooted in the software used to operate the hardware. As these errors are discovered, code may be developed and deployed to mitigate or eliminate these errors. Code may also be deployed to improve the function of computer hardware.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for validation and prediction of cloud readiness. The method includes identifying a sample of components from a cloud infrastructure, wherein an update is applied to the sample to generate a treated sample and the treated sample is of a statistically sufficient scale and a relevant cloud-level diversity and identifying a control sample of components from the cloud infrastructure, wherein the control sample is statistically comparable to the treated sample. The method also includes executing a set of workloads on the treated sample and the control sample. Further, the method includes predicting an impact of the update on a user experience based on a comparison of telemetry captured during execution of the set of workloads on the treated sample and the control sample.

Another embodiment provides a method. The method includes uploading an update and scoping an extent of validation and prediction determined via a test case applied to the hardware update, wherein the extent includes determining the workload types, time allowed, number of concurrent components for during the execution of the test case. The method also includes monitoring the execution of the test case, wherein the test case is executed with cloud-level scale and cloud-level diversity and obtaining telemetry from one or more components under test.

In addition, another embodiment provides one or more computer-readable storage media for storing computer-readable instructions. The computer-readable instructions carry out a method for validation and prediction of cloud readiness. The method includes identifying a sample of components from a cloud infrastructure, wherein an update is applied to the sample to generate a treated sample and the treated sample is of a statistically sufficient scale and a relevant cloud-level diversity and identifying a control sample of components from the cloud infrastructure, wherein the control sample is statistically comparable to the treated sample. The method also includes executing the set of workloads on the treated sample and the control sample. Further, the method includes predicting an impact of the update on a user experience based on a comparison of telemetry captured during execution of the set of workloads on the treated sample and the control sample.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
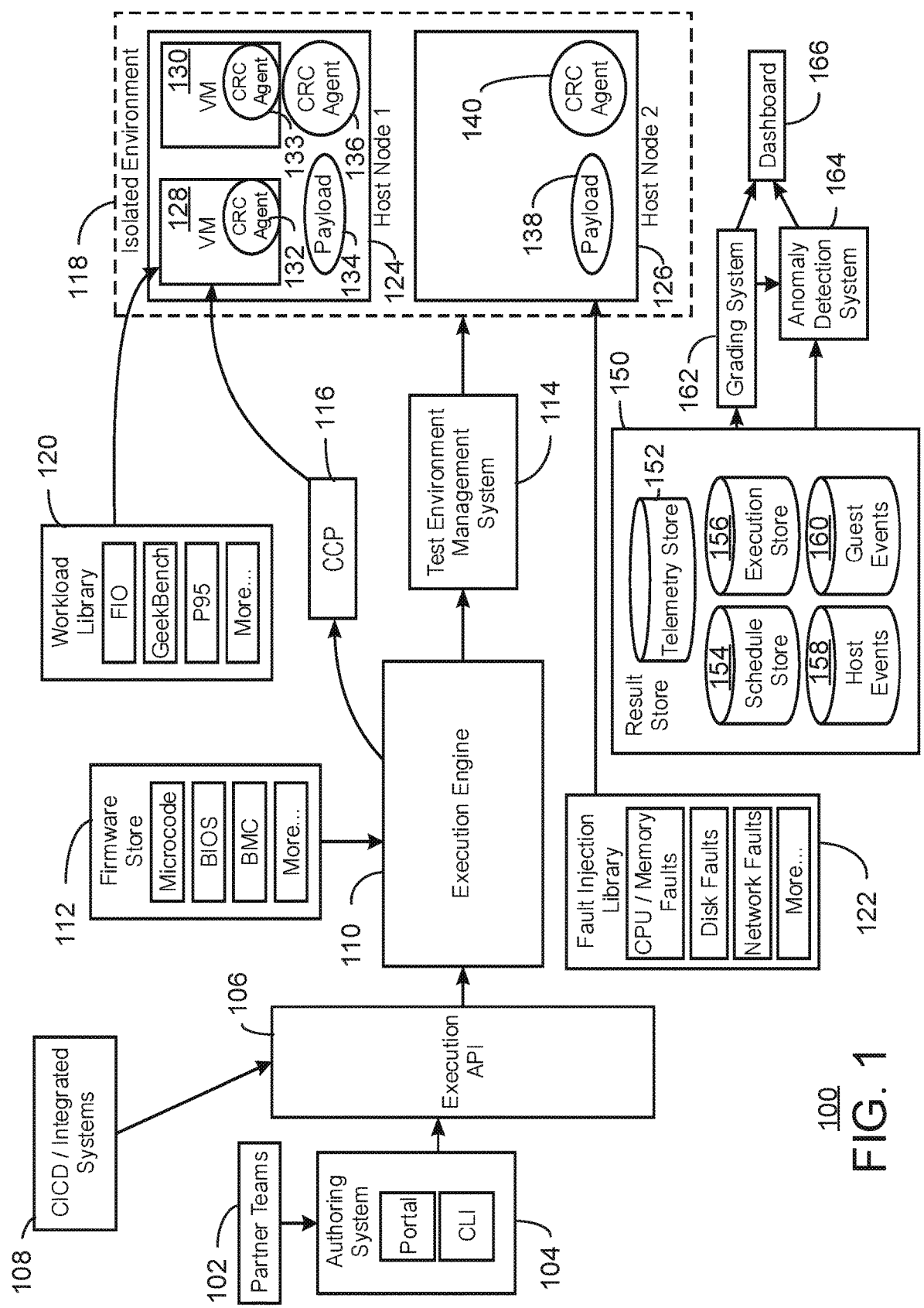
FIG. 1 is a block diagram of a cloud readiness criteria and validation environment.

A cloud infrastructure may be defined as a combination of hardware and software used to enable cloud-based services. The hardware may include servers, racks, networking switches, routers, quantum computers, storage devices, power supply units (PSUs), and the like. The software may include firmware, operating systems, and so on. Cloud computing services, or simply "the cloud," may refer to a network based on the cloud infrastructure that can deliver various computing services. The components used to support the cloud may be designed for a number of applications, such as storing and managing data, running applications, or delivering content or a service such as streaming videos, web mail, office productivity software, or social media. Cloud service providers operate and maintain the network and associated services and applications, which can have elements located around the globe that are communicatively coupled together and operate as a single ecosystem. Users may access services enabled by the cloud according to a predefined agreement with a cloud service provider. Accordingly, users may be clients of the cloud service providers.

The cloud service provider is able to support several users and provide access to the cloud infrastructure. Each user's data may be isolated and remain invisible to other users. The cloud service provider may manage the cloud infrastructure by, for example, the installation of new hardware, the replacement of hardware, repairs to the hardware, installing new software, updating software, and the like. Provisioning hardware and software for each user gives the cloud service provider access to cloud usage data for each user. The cloud usage data may be, for example, the type of workloads, volume of workloads, expected responses, resource consumption distributions across users and seasons, user interest in various shop keeping units (SKUs) of hardware, software, and services.

Accordingly, the cloud service providers are tasked with providing state-of-the-art services and maintaining an ever-evolving cloud. Indeed, the cloud undergoes continuous changes at various levels. First, the workloads on the cloud, cloud management, the cloud control fabric, and the software infrastructure are continuously evolving. For example, hypervisors, OSes, and device-drivers are constantly changing. Moreover, the cloud hardware and low-level infrastructure are changing and evolving. While the cloud service provider manages and maintains the evolving cloud, its hardware and related software may be provided to the cloud services provider by a hardware supplier. Errors in the hardware and software underlying the cloud can cause the hardware or software to fail during operation, resulting in a disruption of the cloud services provided to users. Such disruptions can cause user experience regressions.

Regressions in the functionality of the cloud infrastructure can be a result of a bad hardware or software update introduced to the cloud infrastructure. For example, components of the cloud infrastructure such as nodes, servers, hard disk drives, modems, switches, routers, racks, power supply units, rack-managers including controllers, firmware and sensors, networking components at multiple levels, storage, cooling infrastructure, or high-voltage infrastructure may be subjected to defects such as bugs or errors. Regressions may be, for example, an issue introduced by a recently deployed update introduced to the cloud hardware or software. In some cases, the regressions indicate an issue or failure as observed by a user during the execution of cloud services for that user. Typically, the user has an agreement for a particular level of service with the cloud service provider. Hardware errors can cause the cloud service provider to breach this agreement with the user. Often, the errors in the hardware and resulting hardware failure can only be addressed by the hardware supplier. In response to the discovery of a hardware error or a hardware-based cloud failure, the hardware supplier can provide software or hardware updates to update, fix, or improve hardware functionality.

Generally, an update is a modification of a cloud infrastructure. For example, code may be developed to update, fix, or improve hardware or software functionality. In embodiments, the code may be referred to as an update. In examples, the update may be microcode, where the microcode is a set of instructions that enables a configuration or reconfiguration of hardware. In embodiments, the microcode may be a programmable layer of instructions that functions as an intermediary between the hardware and the instruction set architecture associated with the hardware. Similarly, the update may also be firmware that enables a basic functionality of the hardware. For example, firmware may provide instructions that define how components such as video cards, keyboards, and mice communicate and perform certain functions. An update may also be newly installed hardware, replacement hardware, or repaired hardware.

When errors or defects are discovered in the cloud infrastructure, updates may be created that mitigate or eliminate the discovered errors or defects. Even when an update is provided that eliminates the errors or defects, the cloud service provider may have still breached agreements with the users due to the error or defect. In the case of hardware errors, a hardware supplier may provide an update to eliminate the errors or defects. However, the hardware supplier may lack the knowledge and resources to adequately test the hardware for errors or defects, as the hardware supplier is unaware of the workloads, scenarios, and other aspects to be applied to the hardware. Furthermore, an update itself may introduce regressions and a supplier of the update is typically unable to predict an impact of the update on a user experience. Further, it is often challenging to validate that an update is indeed suitable for deployment within the cloud infrastructure.

The present techniques enable validation and prediction of cloud readiness. As used herein, the cloud readiness of an update indicates the update's suitability for use in the cloud infrastructure. In assessing the cloud readiness of an update, the present techniques predict an impact of an update on a user's experience. In embodiments, this prediction may occur by mimicking or simulating user workloads. The prediction of an impact on the user experience may also occur using actual user workloads. An update may be validated when a predicted impact of an update on a user experience is unnoticeable by the user. As used herein, a predicted impact of an update may be noticeable when the update negatively changes the user's operation or access to the cloud infrastructure.

As described herein, an update may be a physical hardware update, where hardware is replaced, repaired, or positioned in a particular configuration. An update may also be a software update, wherein code is provided to eliminate or mitigate software errors. Examples of software updates include microcode (uCode) changes to a central processing unit (CPU), firmware and microcode changes to a graphics processing unit (GPU), firmware changes to a network chipset, basic input/output system (BIOS) changes, field programmable gate array (FPGA) reprogramming, hybrid hard drive (HHD) firmware, solid state drive (SSD) firmware, host operating system, network interface card (NIC), and the like. Software updates may also include device specific code, such as device drivers.

For ease of description, the present techniques are described as assessing and predicting the cloud readiness of an update to a "component." The term "component" may refer to any electronic device, including sub-components of what is typically considered a component. The term component may also refer to software. For example, the present techniques can validate and predict the readiness of a software update to device drivers as a component of the cloud infrastructure. The present techniques can also validate and predict the cloud readiness of a firmware update to a graphics processing unit (GPU) as a component of a graphics card installed in a Peripheral Component Interconnect Express (PCIe). In another example, the present techniques can validate and predict the readiness of a firmware update to a power supply unit (PSU) as a component that provides power to a rack of components often used in data centers. Each rack may include components such as nodes, servers, hard disk drives, modems, switches, routers, and other electronic equipment. In this example, samples may be identified for statistical analysis as described below, although the particular update under test is applied to a component that indirectly influences the samples. Additional examples of components with applied updates that can have their respective cloud readiness validated and predicted include updates to the network infrastructure, cooling infrastructure or storage services.

Ultimately, cloud readiness is defined by the user experience and the costs associated with providing a satisfactory user experience. For example, an update which leads to large number of virtual machine (VM) interruptions is not cloud ready. Similarly, a cloud service provider spending significantly more on redundancy to placate such interruptions so users are unaware of the interruptions may also imply that the underlying update is not cloud ready. Accordingly, in embodiments an update is cloud ready when the user-noticeable issues (interruptions, outages, blips, etc.) it root-causes are less than a required threshold and the overhead required to satisfy this threshold is contained in terms of cost, effort, etc. However, user noticeable may depend on the users and their respective workloads. Additionally, noticeable may change over time. Moreover, the particular threshold is not predefined. Rather, the threshold may be a function of user expectations, contracts and actionable SLAs, which tend to evolve over time.

Thus, a cloud readiness criteria (CRC) as described herein validates an update and predicts if the update is cloud ready. In embodiments, the cloud readiness criteria may include tests, experiments, statistical analysis and predictions. In embodiments, the cloud readiness criteria are defined by a measure of user-noticeable issues caused by the update and the costs associated with keeping this measure below a particular threshold. In embodiments, the measure of user-noticeable issues caused by the update and the costs associated with keeping this measure below a particular threshold enables a prediction of the user impact as associated with the hardware update. In this manner, the present techniques enable a validation and prediction of whether a hardware update satisfies a cloud readiness criteria as defined de-facto by the collection of tests at the time, user expectations, contractual obligations, and cloud management fabric and infrastructure aspects.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," "client," "server," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

As used herein, the term "hardware supplier" may refer to any supplier of hardware components. In examples, a hardware component of the cloud infrastructure may be obtained from the cloud service provider. In other examples, the hardware component of the cloud infrastructure may be obtained from a third party other than the cloud service provider.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

Validation and prediction of cloud readiness as described herein enables validation of an update in view of frequent and complex updates applied to the cloud infrastructure. For example, microcode updates, BIOS changes, and network card firmware may be updated more frequently than in the past. Additionally, hardware update complexity is generally increasing both for the update itself and the interaction of the update with other aspects of the networked hardware and infrastructure. Moreover, traditionally it is difficult to validate an update for cloud-readiness due to an ever-evolving user experience within the cloud including cloud infrastructure and management, the hardware used by cloud, user base, workloads and user expectations. In other words, traditionally it is challenging to mimic a cloud as its de-facto specification is changing constantly. Furthermore, the complexity of cloud is changing and generally increasing. For example, the integration between hardware and software is ever more intricate with concepts such as mitigating threats, optimization, and secure boot applied to this integration. The cloud hosted workloads are also diverse, which touches ever more nooks-and-crannies in the underlying infrastructure (e.g. leading to the exposure of rather intricate CPU bugs).

Said diversity, too, is evolving regularly. Put another way, the diversity of cloud hosted workloads can expose hardware errors that would normally go undiscovered in typical, standard operation. Finally, scale is needed to test for cloud readiness due the sheer number of workloads and test cases, even without acknowledging the dynamic evolution of the cloud as discussed above.

Generally, it is not feasible for a hardware supplier to consider all possibilities, such as the frequent and complex updates and an ever-changing, diverse, and easily scalable cloud. Additionally, statistical manifestation of issues and flaky behavior of some of the errors are only exposed with the requisite scale and diversity applied to the update during a test case. Further, errors may be elusive, requiring dedicated tools and processes to uncover. Ultimately the cloud service provider is held accountable for any errors observed by users. The cloud service provider provides a buffer between hardware suppliers and users. Therefore, originators of updates are removed from problems attributed to hardware errors and are not accountable for the resultant damage.

FIG. 1 is a block diagram of a cloud readiness criteria environment 100. The environment 100 may be used to test updates to the cloud infrastructure in a networked environment that supports or replicates cloud computing services. The computing services include, but are not limited to devices, storage, networking, and software that stores and manages data, executes applications, or delivers content or a service such as streaming videos, web mail, office productivity software, or social media. In the event of a failure, cloud computing services may be interrupted and the user experience is regressed. The environment 100 enables adequate testing of updates prior to deployment in actual user production workloads. Specifically, the present techniques enable a prediction of an update's impact on a user experience.

As illustrated in FIG. 1, partner teams 102 may access an authoring system 104. The partner teams 104 may represent managed services providers with technical know-how to develop a test case. In embodiments, the partner teams may author a test case via the authoring system 104. The authoring system enables tasks like provisioning virtual machines (VMs) for cloud services in a test case. In particular, the authoring system 104 enables partner teams to develop testing logic and to inspect and adjust test parameters as desired by the partner teams. As illustrated, the authoring system 104 comprises a command line input (CLI) and a portal. The authoring system 104 may be accessed via the command line input and portal. In embodiments, scripts that define tasks associated with the test case can be input to the system 100 via the CLI and portal.

Test cases may be executed on full stack production blades to generate the most realistic cloud conditions. Moreover, the relevant samples may be represented by deploying enough blades that represent the relevant portion of the cloud infrastructure for statistically significant results. In embodiments, the test case may run in a sandbox or in an isolated test environment in production to protect user VMs. User traffic may be emulated, and synthetic workloads can be leveraged to represent user usage scenarios. To emulate production failures, faults may be injected to evaluate the payload impact on resiliency, enabling fast and consistent results. Injecting a fault when executing the set of workloads on the treated sample and the control sample may expose errors in the update or the treated sample. In embodiments, to reduce false positives, tests may be authored such that the only variable is the tested payload.

The scripts obtained via the authoring system 104 enable an execution application programming interface (API) 106 to call a process of the test case that can be executed on a number of cloud infrastructure configurations used to support cloud services. In embodiments, the execution API 106 may take as input the scripts from the authoring system 104. In embodiments, the execution API 106 may also take as input continuous test data regarding a particular build of hardware/software to be tested from the continuous integration continuous deployment (CICD)/Integrated Systems block 108. The CICD/Integrated Systems block 108 enables continuous changes to updates and delivery of these updates during testing. In embodiments, the execution API 106 may be configured to deploy, configure and manage the test cases applied to hardware configurations that support the cloud network.

An execution engine 110 may orchestrate a particular workload to be applied to the test case obtained from the execution API 106. In particular, the execution engine 110 may arrange a sequence of particular tasks of the workflow, and ramp up or slow down the tasks within the workflow as necessary according to the test case. The execution engine 110 may take as input the scheduled scripts and update for testing from a firmware store 112.

The test case and update are sent to a test environment management system 114 and a cloud control plane (CCP) 116 that is able to invoke particular stock keeping units (SKUs), virtual machines, and the like to execute the test case in an isolated environment 118. In embodiments, the particular configuration of components may be referred to as a SKU. Each SKU may uniquely identify a product, service, or any combinations thereof. In embodiments, a SKU may indicate a particular arrangement of hardware made available for use by the cloud provider.

The isolated environment 118 enables protection of workloads, such as the test workloads from a workload environment 120. In particular, the isolated environment eliminates or curbs a potential impact of possibly bogus updates still under test. The isolated environment may vary according to its particular use. For example, a cloud service provider may opt to execute a payload 134 in a duplicate environment mimicking the production cloud. However, the isolated environment may also be process isolation, wherein VMs that execute actual live production workloads are used for testing by isolating a process executing on a user VM. In this case, the testing for validation and prediction as described herein includes adding or injecting a process into VMs owned and used by users in their live production workloads.

The isolated environment 118 may also be realized by temporarily allocating nodes (components) of the cloud infrastructure validation and prediction purposes. The encompassing CCP 116 controls the particular components of the cloud infrastructure request. In some isolated environments, only some of the virtual machines on a treated host node are allocated for the validation and prediction related workloads. The isolated environment 118 can also be realized using more robust (and expensive) isolation levels by dedicating an entire rack (which has multiple host nodes), a whole subnet of compute nodes, and the like.

As illustrated, faults from a fault injection library 122 are optionally injected into the isolated environment 118. In embodiments, applying a test case to the A and B samples as described below also includes fault injections. Fault injections often represent edge cases and errors, which are those scenarios that are considered unlikely or far-fetched. Deliberate fault injection accelerates coverage of said edge cases and practically shortens the time needed to expose related issues. The idea behind fault injection is to catalyze situations that are naturally occurring rarely. This enables a reduction in the time it takes to evaluate an update and increase the confidence that the validation and prediction suffices. Often, situations that cause an error may occur one-per-million node-days. Fault injection artificially increases the odds for the sake of coverage. Naturally, the same injection is applied qualitatively and quantitatively to both the A and B samples as described below.

As illustrated, the isolated environment 118 includes a host node 124 and a host node 126. In many cloud implementations the host nodes 124 and 126 are used to host VMs which are provided to users. In other cases, the host nodes manage storage which is provided to user applications. The test cases may be applied to each of the host node 124 and the host node 126. The host node 124 includes a virtual machine 128 and a virtual machine 130 used by guest stacks. Often, the guest realizes a full computing stack, similar to physical computers. The virtual machine 128 may include a guest agent (GA) 132. The virtual machine 130 may include a GA 133. The workload executed by a VM may be referred to as a guest. The present techniques may include a guest agent with responsibilities analogous to a host agent. For example, the guest agent may collect telemetry from a guest operating system and processes executing on the guest agent. In embodiments, the guest agent may be used to inject faults from the fault injection library 122.

A payload 134 may be applied to the host node 124. A cloud readiness criteria host agent 136 resides on the host node 124. Similarly, a payload 138 may be applied to the host node 126. A cloud readiness criteria host agent 140 resides on the host node 126. The CRC host agents 136 and 140 collect various telemetry directly from their respective host node. This may be redundant when the telemetry collected by the control plane 116 suffices. However, the CRC host agents 136 and 140 have greater access to detailed data when the host node is isolated (so, there is no concern about user data privacy, and less of a concern about impacting negatively the overall performance of the host node due to intense telemetry gathering). In embodiments, another purpose of the CRC host agent 136 and 140 is unfettered control of the host itself, e.g. inducing reboots or injecting artificial host level faults.

Results from the test case may be stored in a result store 150. In embodiments, the results store includes a telemetry store 152, a schedule store 154, an execution store 156, a host events store 158, and a guest events store 160. Results may include the outputs of the testing applied to samples as described below. These results may include, for example, a pass/fail indication, in the case of a failure an identification of a layer where the failure occurred (such as hardware, host operating system, virtual machine, guest operating system, application, and the like), and telemetry from such layers. As described herein, telemetry is defined as general measurements from various points in the samples under test. For example, telemetry may include performance indicators of hardware and software at various such layers, various measurements and/or time series data such as voltage and temperature, as well as logs from the various layers. Moreover, telemetry may include output of the test case, logs, and telemetry from the cloud control plane 116. Thus, telemetry captured during execution of a workload may comprise an output or result of the workload execution and metrics derived from the underlying cloud control plane, the hardware configuration, or any combinations thereof.

A test case extent may include any number of variables. For instance, the workload type may define the test case. The workload type may be multi-variable. Different workload types may be described as computational heavy, memory focused, I/O or networking bound, workload duration, workload intensity, or workload order. Moreover, various infrastructure variables can be defined for a test case. These infrastructure variables include virtual machine (VM) SKUs, VM sizes, VM densities, Guest OS, Geo-location, and many others.

Results and telemetry from the result store may be transmitted to a grading system 162. The grading system 162 provides a grade or rating to an update with test results stored in the result store 150. For example, an update may not meet the readiness criteria needed for servicing external users, but may still be of sufficient reliability to be used internally for select workloads (which are deemed less sensitive to the host quality). The anomaly detection system 164 analyzes the data patterns in the results and telemetry and identifies anomalies. For example, anomaly detection system 164 can identify problem components in a large fleet by subtle perturbations in the received telemetry. The dashboard 166 is a visual representation of the cloud readiness criteria environment 100. The dashboard 166 may visually render quantitative aspects like number of A sample nodes and B sample nodes currently executing.

In embodiments, the change in a cost of overhead associated with delivering a sufficient quality user experience is predicted using the telemetry captured during execution of the set of workloads. A sufficient quality user experience may be a user experience that lacks a noticeable negative impact on the user experience. An overhead associated with ensuring a quality user experience may be assessed, wherein the overhead and a threshold are defined in terms of cost in currency, degrees of redundancy, energy consumed, hours of labor due to added redundancy, placating quality issues, or any combinations thereof.

The block diagram of FIG. 1 is exemplary and should not be viewed as limiting to the environment 100. Note that the environment 100 can have more or fewer blocks than those illustrated in the example of FIG. 1. Moreover, the blocks may be implemented via a computing component such as the computing device 500 of FIG. 5.

Validation and prediction of an update's impact on the user experience may be determined via statistical methods. The prediction may be drawn from the conclusion and extrapolation of data from the comparison of A-B samples' behavior over a scoped timeline (e.g. a few weeks), as applied to the whole population to predict anticipated behavior over an extended period of time (or without a determined end point). In particular, observations from a control sample may be compared with observations from a treated sample. As used herein, the control sample may be referred to as an "A sample," and the treated sample may be referred to as a "B sample." Each of the A sample and the B sample may be obtained from a given population. In embodiments, the samples are "representative" of components directly or indirectly under test. Thus, a representative sample as used herein refers to a subset of components from the population that is a typical example of a group, quality, or kind associated with the particular update under test. Thus, the update under test can dictate or inform the samples selected for comparison.

In embodiments, the extrapolation used to draw a prediction of an update's impact on the user experience is an identity function applied to the whole population based on the comparison and conclusion of A vs B results. If the treated B sample performed better or worse than the controlled A sample for a limited time range with statistical significance, the behavior can be extrapolated for the population. This behavior as applied to the population can predict the performance of the update on the whole population represented by the sample for an unbounded time span.

In another embodiment, the extrapolation is an actual function as opposed to an identity function. This actual function may be used for various reasons. For example, the A and B samples may not be as representative of the broader corresponding population as desired. In such cases, the extrapolation of the A-B comparison may require a function accounting for the difference between the sample and the broader population. For example, consider the case where a broader population has a slower CPU than the A-B samples. In this example, the extrapolation would have to "correct" the expected performance accordingly, which might deem the update as inadequate. Another reason for the use of an actual function is to introduce a safety margin. For example, if the sample has a more relaxed power consumption limit than the broader population and the update consumes a little more power, then it might render it inadequate (which in effect is an extrapolation function impacting the prediction).

In A-B comparison according to the present techniques, the control sample and the treated sample are statistically comparable. As used herein, statistically comparable may refer to samples that are similar in quality, quantity, or kind. For example, statistically comparable samples may have the same types and numbers of components. Accordingly, statistically comparable samples are those samples obtained from a population that satisfy the same sample requirements, such as the type and number of nodes, servers, hard disk drives, modems, switches, routers, virtual machines, or other components.

In statistical testing according to the present techniques, two samples are selected that are statistically comparable. One sample is designated as the A or control sample, and the other sample is designated as the B or treated sample. The A or control sample is a hardware/software configuration without the update applied. The B or treated sample is a hardware/software configuration with the updated applied. Comparing the performance of a treated sample to a control sample is of importance as components typically experience background noise issues, where the issues are not immediately noticeable.

Several A-B comparison techniques may be analyzed statistically and subsequently extrapolated upon the broader population across unbounded time spans to create a prediction of the impact on the user experience and determine whether the update is cloud ready. For example, the A-B comparison may be based on overall performance. The treated B sample having worse performance may be a negative indicator and vice versa. Performance indicators include any of: time based benchmarks (less elapsed time is usually considered better), extent of concurrency (more is often better, but in some cases less is considered better), number of IO operations, total energy dissipation (less is typically better), power consumption, number of compute cycles, memory footprints, and so forth. These performance indicators might vary across the entities in a sample. Therefore, statistical methods are useful.

Another comparison may be to count a number of particular incidents. Some of the issues manifest stochastically as failures and breakage of aspects or components of the cloud infrastructure. Any isolated incident might not mean much, as it might appear like an occasional incident. When the incident is tracked across a representative and sufficiently large sample, such incidents may be extrapolated upon. The number of such incidents may be counted and then extrapolated for the population based on this count. In embodiments, the incidents may be screened for those that occur for irrelevant or legitimate causes.

Leading indicators (LIs) preceding the event of a failure or breakage of a cloud infrastructure aspect may be analyzed statistically and subsequently extrapolated upon the broader population across unbounded time spans to create a prediction of the impact on the user experience and determine whether the update is cloud ready. For example, the latency of a storage unit might increase significantly prior to total failure. The power consumption of a dual in-line memory module (DIMM) might deviate from the common pattern for the model, prior to breaking down. In embodiments, several leading-indicators are tracked. The leading indicators may be monitored automatically for deviations and departures from patterns exhibited by healthy nodes (or other aspects). Alerts may be issued regarding such anomalies. In this manner, leading indicators may provide insight into the behavior of an update and also enable a reduction of the sample size and the time needed to get credible experimental data.

In certain situations, it is worthwhile to analyze a time-to-first-anomaly and gather this data as a statistic for the A and B samples. An anomaly may be a failure of a component. In some cases, the anomaly may be more subtle. For example, the anomaly may be a departure of a leading indicator from the common patterns in healthy samples (or populations). In this example, if B exhibits less or more earlier failures than A, then the update is an improvement or deterioration relative to A, respectively.

Cloud infrastructure components such as nodes, VMs, switches, storage, etc. will typically experience some issues during execution. Thus, the present techniques compare the A/B samples in order to determine which issues can be attributed to the update when both samples can expect some type of issue to occur. The comparison may be, for example, a comparison of availability versus outage, uptime versus downtime, interruptions, data loss, and the like. In embodiments, the comparison contrasts the specifics of such anomalies. For example, if the A and B samples failed for different reasons unexpectedly or even merely failed with different telemetry unexpectedly, these failures may indicate that the update introduces differences—which might be deleterious. Additionally, general telemetry from each sample may be compared. For example, general telemetry such as power consumption, heat footprint, number of compute cycles, performance of storage and the like can be compared for each sample.

The workloads used for testing encompass both complexity and diversity associated with typical cloud-based workloads. Cloud inherent scale and diversity may be used during testing to ensure sufficient resources enabling coverage of the test cases needed to test for cloud readiness criteria. Specifically, the A/B samples under test are allocated to ensure adequate support to execute the required workloads. In embodiments, the samples under test are scaled to ensure sufficient components are used to run the required workloads. In embodiments, scalability may refer to the ability to create or expand the computing/storage capacity of samples under test to accommodate typical cloud usage demands. Additionally, a statistically sufficient scale may indicate a sample size that reduces a margin of error to below a predefined threshold. By scaling the samples under test, the present techniques ensure that a user does not experience regression due to a lack of adequate components available to test. In embodiments, a size of a sample may determine a confidence level of the validation and prediction of the cloud readiness.

In embodiments, a P-value may be determined for the results of the statistical analysis. The P-value may indicate a data point at which the results are considered statistically significant. For example, a p-value threshold of 0.1 or 0.05 may be used, where values less than the threshold are statistically significant. In embodiments, the p-value may be increased or decreased depending on the nature of the component being updated and other considerations.

Diversity ensures a sufficient variety of component instances are available in each sample for update testing. In embodiments, the relevant cloud-level diversity implements a variety of component instances applicable to the update in the treated sample and the control sample. Typically, a cloud service provider may provide access to numerous SKUs. Samples for testing are representative of these SKUs. To derive a sample for testing in view of a particular SKU, the hardware SKUs may be first filtered for applicability. For example, given microcode change, only blades with CPUs impacted by said microcode change are considered for inclusion in predicting the correctness of and validating the microcode change. In embodiments, the sample of hardware SKUs should span over the equivalent classes spanning the general population of hardware SKUs that were determined to be applicable to the current microcode change. For example, the general population of applicable hardware SKUs should include blades with CPUs of varying steps, varying memory types and sizes, varying bus frequencies, varying BIOS, etc.

Further, for validation of the microcode change or update, each equivalent class needs multiple instances of hardware. Each equivalent class is sized to suffice for A/B analysis. In examples, each equivalent class may include dozens of nodes or more. In embodiments, the equivalent class sizes may be skewed to amplify various signals. For example, if the update is suspected to lead to flaky behavior in some classes, then the sample sizes may be increased accordingly. Additionally, if a certain class has a history of errors, then the corresponding sample sizes are increased. Finally, if a certain workload is known to cause errors, then the number of nodes exposed to this workload is increased across the equivalent classes.

By manipulating the scale and diversity of associated A/B samples under test, testing according to the present techniques can exercise the workloads repeatedly, at a statistically significant scale, and in different integrated environments of a cloud operated and managed by a cloud service provider. A correctness of the update may be predicted based on the results of the workload execution by the applied updates.

Figure 2:
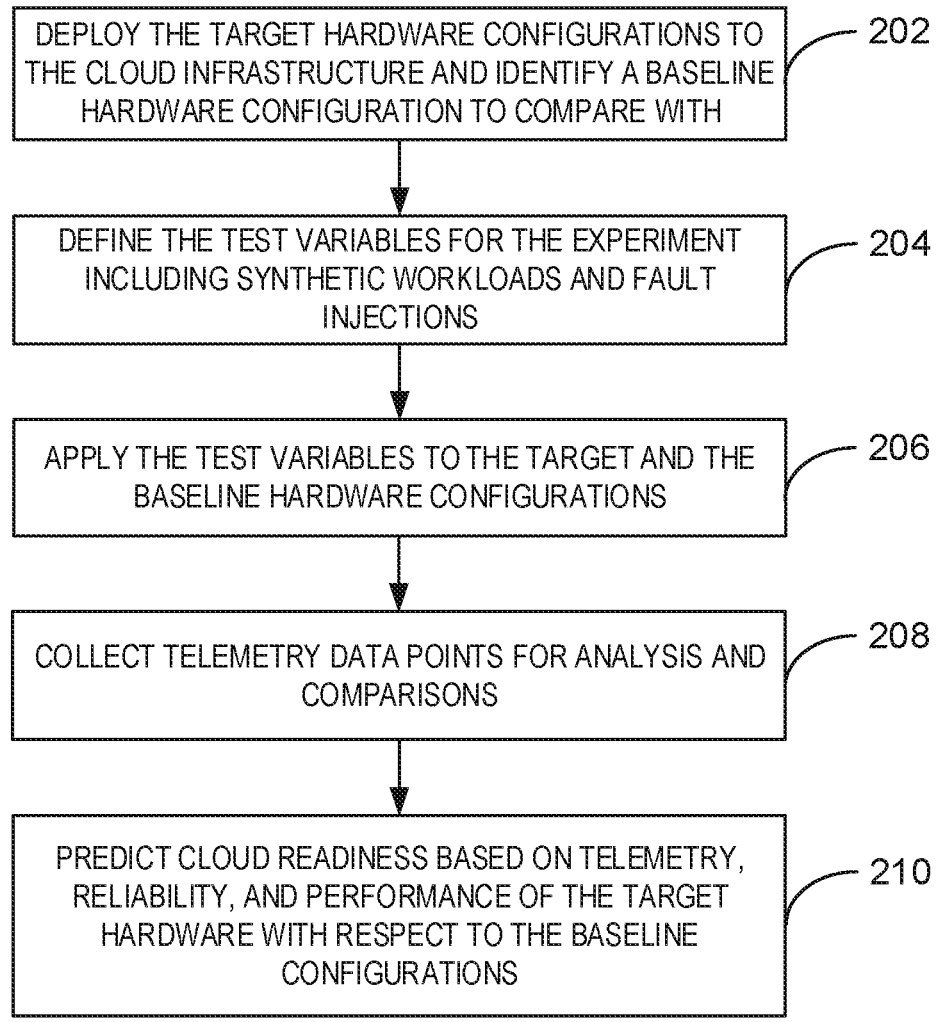
FIG. 2 is a process flow diagram of a method that enables validation and prediction of cloud readiness of a hardware update.

FIG. 2 is a process flow diagram of a method 200 that enables validation and prediction of hardware updates. In embodiments, the method 200 enables a cloud service provider to predict the correctness of a hardware update, such as a newly installed component or a repaired component. Components may be, for example, hardware devices such as servers, racks, networking switches, routers, quantum computers, storage devices, power supply unites (PSUs), and the like. A hardware update according to the present techniques may be a particular configuration of components. This configuration of components may be referred to as a target hardware configuration. Accordingly, at block 202 a target hardware configuration is deployed in the cloud infrastructure. Additionally, a baseline hardware configuration is identified. The target hardware configuration and the baseline hardware configuration may be compared as described above. In particular, the baseline hardware configuration may be considered a control or A sample. The target hardware configuration may be considered a treated or B sample.

At block 204, test variables for an experiment are defined. As used herein, an experiment refers to a run of a workload on components of the cloud infrastructure. In the case of host nodes, an experiment may be comprised of the workload to be executed on the host. In embodiments, test variables include synthetic workloads and fault injections. The synthetic workloads may be selected according to a typical workload for the baseline hardware configuration. Accordingly, the synthetic workload may include one or more tasks known to exploit or execute on at least a portion of the baseline hardware configuration. In embodiments, the experiment may be a test case as defined by the target hardware configuration, synthetic workload, and fault injections. The test case is executed with a cloud inherent scale and a cloud inherent diversity. In embodiments, the updates may be tested in a production environment by using synthetic workloads designed to cover hardware functionality in general, and the changed aspects in particular. The use of synthetic workloads may be performed such that it does not impact production workloads. Additionally, fault injections may be selected to mimic testing scenarios that occur rarely under typical circumstances.

At block 206, the test variables are applied to the target hardware configuration and the baseline hardware configuration. Put another way, each of the A sample hardware configurations and B sample hardware configurations are tested under similar conditions. At block 208, telemetry data points are collected for analysis and comparison. The telemetry data points are collected for each of the target hardware configuration and the baseline hardware configuration. At block 210, cloud readiness of the update is predicted based on the telemetry, reliability, and performance of the target hardware configuration with respect to the baseline configuration.

Figure 3:
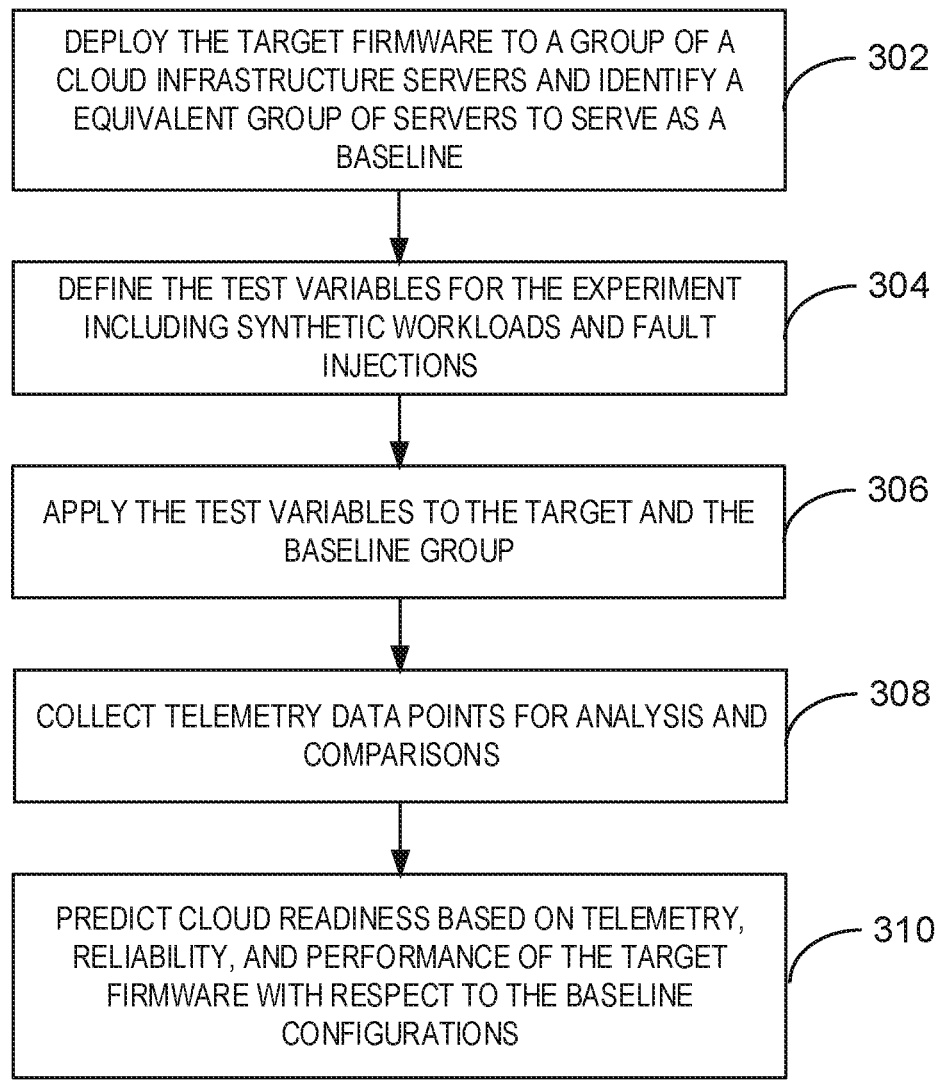
FIG. 3 is a process flow diagram of a method that enables validation and prediction of cloud readiness of a firmware update.

FIG. 3 is a process flow diagram of a method 300 that enables validation and prediction of software updates. In embodiments, the method 200 enables a cloud service provider to predict the impact on a user experience of a software update, such as microcode. Accordingly, the software update may be, for example, code, microcode, firmware, and the like. In embodiments, the software update is code that is to modify or mediate the functionality of the hardware. In some cases, the update may be code applied to update a physical component. For example, the update may be to firmware of a physical component. In the example of FIG. 3, target firmware is described as the software update. However, any software update can be used according to the present techniques.

At block 302, the target firmware is deployed to a sample of cloud infrastructure servers. An equivalent group of servers is identified to serve as a baseline. The target firmware and the baseline firmware may be compared as described above. In particular, the baseline firmware may be a previous version of the firmware, and considered a control or A sample. The target firmware may be considered a treated or B sample.

At block 304, test variables are defined for an experiment. In embodiments, the test variables include synthetic workloads and fault injections. The synthetic workloads may be selected according to a typical workload for the baseline firmware. Accordingly, the synthetic workload may include one or more tasks known to exploit or execute on at least a portion of the baseline firmware. In embodiments, the experiment may be a test case as defined by the target firmware, synthetic workload, and fault injections. The test case is executed with a cloud inherent scale and a cloud inherent diversity. In embodiments, the updates may be tested in production environment by using synthetic workloads designed to cover hardware functionality in general, and the changed aspects in particular. The use of synthetic workloads may be performed such that it does not impact production workloads. Additionally, fault injections may be selected to mimic testing scenarios that occur rarely under typical circumstances.

At block 306, the test variables are applied to the target firmware and the baseline group. Put another way, each of the A sample and B sample are tested under similar conditions. At block 308, telemetry data points are collected for analysis and comparison. The telemetry data points are collected for each of the target firmware and the baseline firmware. At block 310, cloud readiness of the update is predicted based on the telemetry, reliability, and performance of the target firmware with respect to the baseline configuration.

Figure 4:
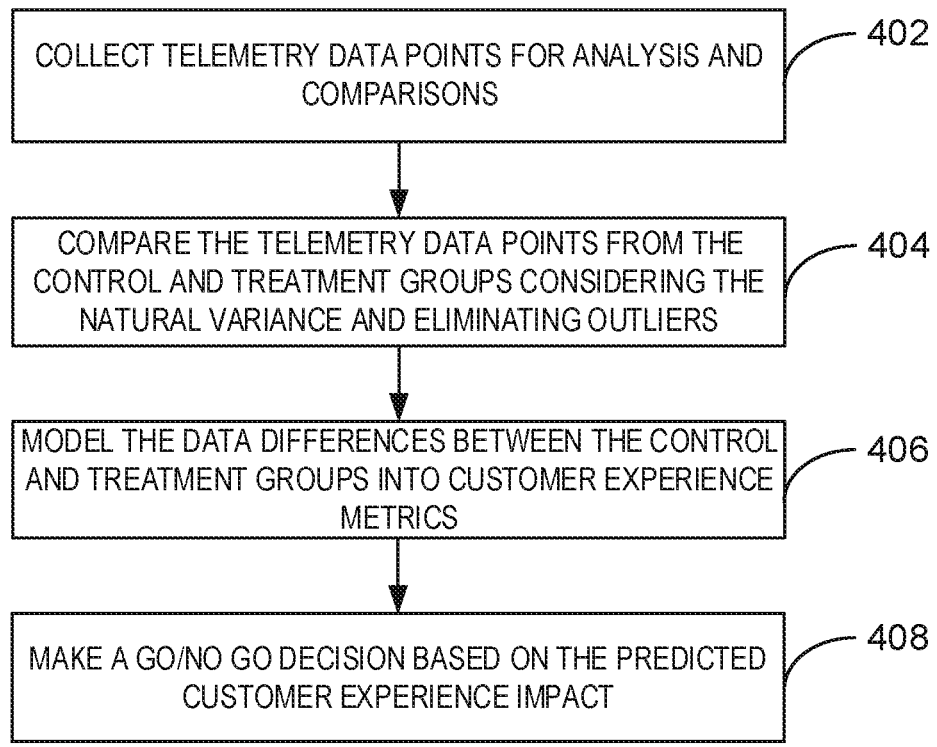
FIG. 4 is a process flow diagram of a method that enables statistical analysis of results and telemetry data captured during testing of a control sample and a treated sample.

FIG. 4 is a process flow diagram of a method 400 that enables statistical analysis according to the present techniques. At block 402, telemetry data points are collected for analysis and comparison. The telemetry data points may be collected, for example, at block 208 of FIG. 2 or block 308 of FIG. 3. At block 404, the telemetry data points from the control sample and the treated sample are compared. During this comparison, a natural variance of the data points is considered. Moreover, during this comparison outliers in the telemetry data points are eliminated. At block 406, data differences between the control sample and the treated sample are modeled into customer experience metrics.

At block 408, a go/no go decision on the deployment of the update is made based on a predicted impact to the user experience. The go/no go decision is enabled by a determination of the root cause of user regressions and prevents regressions from leaking into production with a "no go" decision. In embodiments, a regression may be an issue introduced by a recently deployed update introduced to the cloud infrastructure. The regression can also be a latent bug that has been dormant until a particular payload or change in the cloud infrastructure causes the bug to become prominent. Becoming prominent, as used herein, may refer to a noticeable issue. In some cases, a user regression is indicated via an annual interruption rate (AIR) or user deployment performance/reliability (TDP/R) spikes. The AIR and TDP/R metrics are two fundamental KPIs that may be used to understand, baseline, and compare the impact of hardware, software and configuration changes to cloud data and control planes on the user experience. Predicting the impact of the update on the user experience may also include a prediction of the AIR impact of any update. In embodiments, the AIR metric may measure a likelihood of an interruption to the user experience, within a year. Accordingly, AIR is a user experience focused KPI. In embodiments, the AIR and TDP/R metrics are derived from the underlying cloud control plane, the hardware configuration, or any combinations thereof.

The present techniques can address the challenge of assessing cloud readiness in an ever evolving and complex dynamic environment, whereas existing methods are limited to statically configured labs. Not only the latter is overwhelmed by complexity and diversity of the cloud, it cannot possibly keep pace with the dynamic nature of the cloud evolution. Moreover, the present techniques address the reality that large populations always exhibit edge cases and errors. Accordingly, the present techniques leverage the probabilistic behavior of large populations, whereas existing approaches are limited to deterministic testing or capturing flakiness at best.

In some cases, validation and prediction of cloud readiness is a service. By enabling CICD integration, cloud readiness criteria may be analyzed and assessed by third parties, such as a hardware vendor. The CICD integration may be enabled via the CICD/Integrated Systems block 108 of FIG. 1. Continuous integration (CI) and continuous delivery (CD) enables the delivery of test cases to the test environment with speed, safety, and reliability. In particular, continuous integration (CI) allows developers, such as partner teams, to integrate code into a shared repository several times while building a test case. Each check-in is then verified by an automated build, allowing teams to detect problems early. By integrating regularly, errors can be detected quickly and located more easily. Continuous delivery (CD) is the implementation of updates into validation and prediction processes. In this manner, the update and ultimately the hardware configuration and cloud are always in a deployable state, even in the face of partner teams making changes on a daily basis.

To enable cloud readiness as a service, the cloud readiness criteria system enables ad-hoc requests, which could be cloud readiness criteria-validated concurrently. This entails dynamic response and provisioning of adequate resources corresponding to the type of hardware update, automatic control plane managing the concurrent validation, and the like. Additionally, the cloud readiness criteria system enables multiple users and multiple users within an account, tenant or subscription. Finally, the cloud readiness criteria system must be instrumented allowing programmatic and scriptable integrations. The programmable and scriptable integrations may enable processes as described below.

For example, an update may be deployed. In some cases, the update is deployed with metadata informing its applicability (filtering of target hardware nodes) and deployment directives or tooling. For example, deployment directives or tooling may include time delays, reboots, directing/scripting of the deployment, and optionally tooling related to the directing/scripting of the deployment. An extent of validation and prediction is scoped. As used herein, scoping refers to determining the workload types, time allowed, number of concurrent nodes for use during a test case. Next, a test case derived from the extent of the desired validation/prediction is monitored. In particular, an API may be implemented to start, stop, get interim progress status, interim results and final results. Telemetry is obtained from A/B samples under test. In particular, an API may be implemented to obtain telemetry from the systems under test, which allows troubleshooting and debugging of those systems. An API may also reserve/release hardware capacity as to ensure that the needed hardware is available/released.

In this manner, third parties can have access to cloud readiness criteria and can validate or predict the readiness of a hardware update. The access to cloud readiness criteria as described herein may be provided as a service to third parties, leading to a change in the economy of development of hardware updates. For example, a CPU developer would be able to iterate changes to microcode in small steps very much like software developers, validating said incremental changes against the actual evolving cloud. Traditionally, CPU developers are limited to statically configured labs. By extension, the validation pipeline (aka CICD pipeline) of hardware updates can be integrated live to rely on a cloud readiness criteria service as described herein.

Figure 5:
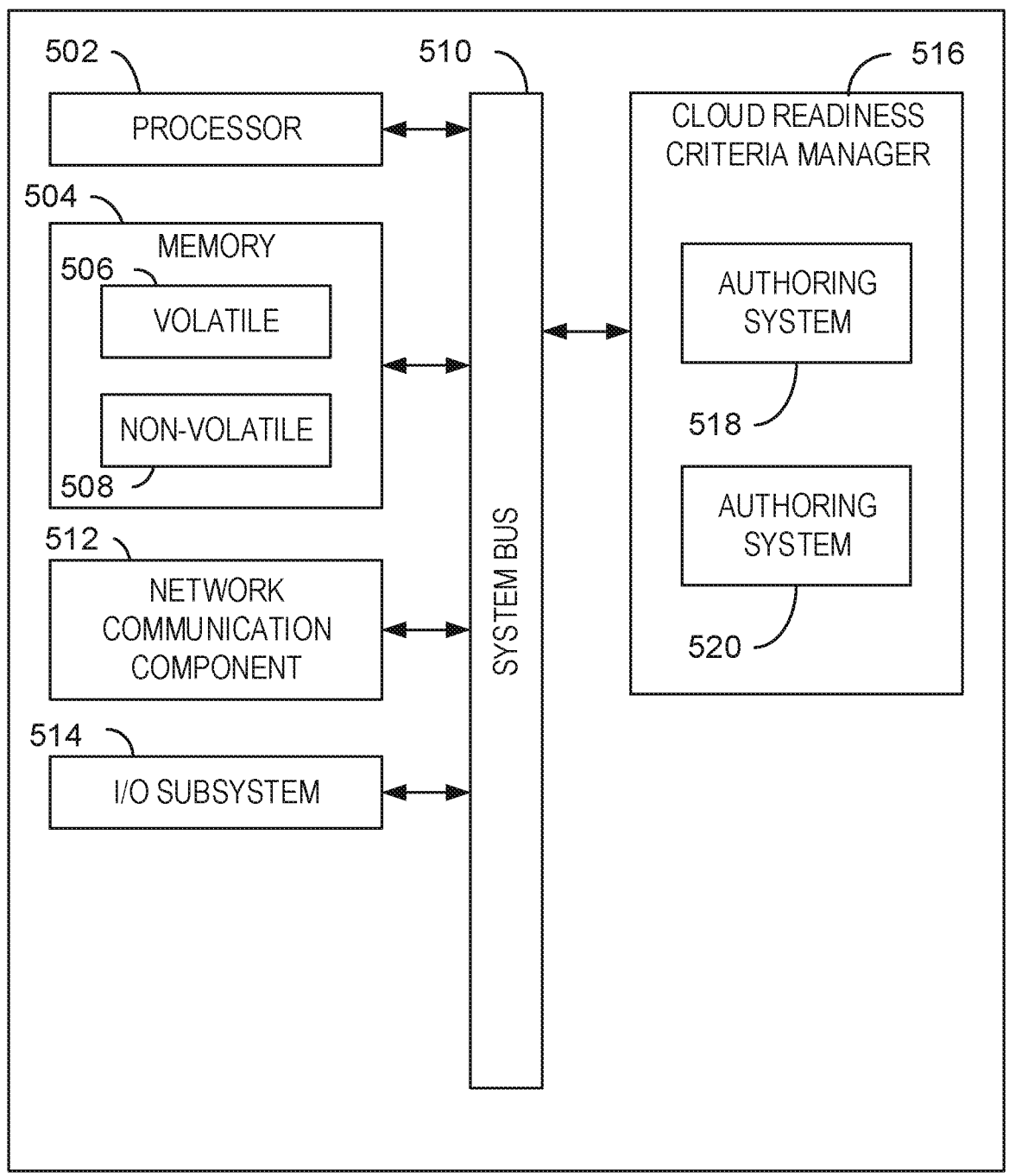
FIG. 5 is a block diagram illustrating an exemplary computing device configured to validate and predict cloud readiness according to aspects of the disclosed subject matter.

Turning to FIG. 5, FIG. 5 is a block diagram illustrating an exemplary computing device 500 configured to validate and predict cloud readiness according to aspects of the disclosed subject matter. FIG. 5 is one embodiment of a computing environment in which architecture 100, or parts of it, (for example) can be deployed. The exemplary computing device 500 includes one or more processors (or processing units), such as processor 502, and a memory 504. The processor 502 and memory 504, as well as other components, are interconnected by way of a system bus 510. The system bus 510 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 5.

The memory 504 typically (but not always) comprises both volatile memory 506 and non-volatile memory 508. Volatile memory 506 retains or stores information so long as the memory is supplied with power. By contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

The computing device 500 may also include other removable/non-removable volatile/nonvolatile computer storage media. By way of example only, computing device 500 may also include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive may be connected to the system bus 510 through a non-removable memory interface. A magnetic disk drive and optical disk drive may be connected to the system bus 510 by a removable memory interface.

The computing device 500 may also include a basic input/output system (BIOS), containing the basic routines that help to transfer information between elements within computer device 500, such as during start-up, and is typically stored in non-volatile memory 508. Volatile memory 506 typically contains data and/or program modules that are immediately accessible to and/or presently being operated on by the processor 502. By way of example, and not limitation, FIG. 5 may also include an operating system, application programs, other program modules, and program data.

Computing device 500 typically includes a variety of computer readable media. Computer readable media can be any available media that can be accessed by computing device 500 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The processor 502 executes instructions retrieved from the memory 504 (and/or from computer readable media) in carrying out various functions of cloud readiness criteria as described above. The processor 502 may be comprised of any of a number of available processors such as single-processor, multi-processor, single-core units, and multi-core units.

Further still, the illustrated computing device 500 includes a network communication component 512 for interconnecting this computing device with other devices and/or services over a computer network. In embodiments, the computing device 500 may enable access to a cloud readiness criteria and validation environment 100 as illustrated in FIG. 1. The network communication component 512, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

The computing device 500 also includes an I/O subsystem 514. As will be appreciated, an I/O subsystem comprises a set of hardware, software, and/or firmware components that enable or facilitate inter-communication between a user of the computing device 500 and the processing system of the computing device 500. Indeed, via the I/O subsystem 514 a computer operator may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer operator and the computing device 500 is enabled via the I/O subsystem 514 of the computing device.

The computing device 500 further comprises a cloud readiness criteria manager 516 and an authoring system 518. The cloud readiness criteria manager 516 may be used to test updates to hardware in an isolated environment 520 that supports or replicates cloud computing services. The computing services include, but are not limited to devices, storage, networking, and software that stores and manages data, executes applications, or delivers content or a service such as streaming videos, web mail, office productivity software, or social media. The authoring system 518 may enable the development of test cases, including testing logic and test parameters. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for validation and prediction of cloud readiness, comprising:
    identifying a sample of components from a cloud infrastructure, wherein at least one of a hardware update or a software update is applied to the sample to generate a treated sample and the treated sample is of a statistically sufficient scale and a relevant cloud-level diversity, and wherein the treated sample comprises at least one of a hardware configuration or a software configuration of the components with the at least one of the hardware update or the software update applied;
    identifying a control sample of components from the cloud infrastructure, wherein the control sample is statistically comparable to the treated sample, and wherein the control sample comprises at least one a hardware configuration or a software configurations of the components without the at least one of the hardware update or the software update applied;
    executing a set of workloads on the treated sample and the control sample; and
    predicting an impact of the at least one of the hardware update or the software update on a user experience based on a comparison of telemetry captured during execution of the set of workloads on the treated sample and the control sample.

2. The method of claim 1, further comprising selecting a set of workloads that represent actual usage of a population represented by the control sample and the treated sample based on characteristics that accelerate a likelihood of discovering an issue with the at least one of the hardware update or the software update.

3. The method of claim 1, wherein the comparison of telemetry captured during execution of the set of workloads on the treated sample and the control sample comprises a statistical analysis comparing metrics derived from the telemetry.

4. The method of claim 1, further comprising predicting a customer impact of the at least one of the hardware update or the software update based on a determined reliability and performance of the at least one of the hardware update or the software update.

5. The method of claim 1, wherein the telemetry captured during execution of the workload comprises output of the workload execution and metrics derived from the underlying cloud control plane, the hardware configuration, or any combinations thereof.

6. The method of claim 1, wherein the statistically sufficient scale is a sample size that reduces a margin of error to below a predefined threshold.

7. The method of claim 1, wherein the relevant cloud-level diversity implements a variety of component instances applicable to the at least one of the hardware update or the software update in the treated sample and the control sample.

8. The method of claim 1, further comprising injecting a fault when executing the set of workloads on the treated sample and the control sample to uncover errors related to the at least one of the hardware update or the software update.

9. The method of claim 1, wherein a change in a cost of overhead associated with delivering a sufficient quality user experience is predicted using the telemetry captured during execution of the set of workloads.

10. The method of claim 1, wherein an overhead associated with ensuring a quality user experience is assessed, wherein the overhead is defined in terms of cost in currency, degrees of redundancy, energy consumed, hours of labor due to added redundancy, placating quality issues, or any combinations thereof.

11. The method of claim 1, wherein the at least one of the hardware update or the software update comprises microcode changes to a central processing unit (CPU), firmware or microcode changes to a graphics processing unit (GPU), firmware changes to a network chipset, basic input/output system (BIOS) code changes, field programmable gate array (FPGA) reprogramming, hybrid hard drive (HHD) firmware, solid state drive (SSD) firmware, host operating system, network interface card (NIC) or any combination thereof to be applied to the cloud infrastructure that revises aspects of the cloud infrastructure.

12. The method of claim 1, wherein the at least one of the hardware update or the software update comprises installation of a new or repaired server, rack, networking switch, router, quantum computer, storage device, power supply unit, or any combination thereof.

13. A computer-readable storage medium bearing computer-executable instructions which, when executed on a computing system comprising at least a processor, carry out a method for validation and prediction of cloud readiness, the method comprising:
    identifying a sample of components from a cloud infrastructure, wherein at least one of a hardware update or a software update is applied to the sample to generate a treated sample and the treated sample is of a statistically sufficient scale and a relevant cloud-level diversity, and wherein the treated sample comprises at least one of a hardware configuration or a software configuration of the components with the at least one of the hardware update or the software update applied;

identifying a control sample of components from the cloud infrastructure, wherein the control sample is statistically comparable to the treated sample, and wherein the control sample comprises at least one a hardware configuration or a software configurations of the components without the at least one of the hardware update or the software update applied;

executing a set of workloads on the treated sample and the control sample; and predicting an impact of the at least one of the hardware update or the software update on a user experience based on a comparison of telemetry captured during execution of the set of workloads on the treated sample and the control sample.

14. The computer-readable storage medium of claim 13, wherein the comparison of telemetry captured during execution of the set of workloads on the treated sample and the control sample comprises a statistical analysis comparing metrics derived from the telemetry.

15. The computer-readable storage medium of claim 13, comprising selecting a set of workloads that represent actual usage of a population represented by the control sample and the treated sample based on characteristics that accelerate a likelihood of discovering an issue with the at least one of the hardware update or the software update.

16. The computer-readable storage medium of claim 13, wherein the cloud-level scale is defined by sufficient nodes to use statistical methods to compare results captured in response to execution of the set of workloads on the treated sample and the control sample.

* * * * *